(12) United States Patent
Pill et al.

(10) Patent No.: US 12,065,059 B2
(45) Date of Patent: *Aug. 20, 2024

(54) GROUND SERVICE SYSTEMS AND DEVICES FOR AN ELECTRIC AIRCRAFT

(71) Applicant: BETA AIR, LLC, South Burlington, VT (US)

(72) Inventors: Jake Pill, South Burlington, VT (US); Cole William Hanson, Burlington, VT (US); Edward Hall, South Burlington, VT (US); Richard Donnelly, South Burlington, VT (US); James Whitehill, South Burlington, VT (US); Bruce Williams, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/116,020

(22) Filed: Mar. 1, 2023

(65) Prior Publication Data

US 2023/0382270 A1    Nov. 30, 2023

Related U.S. Application Data

(63) Continuation of application No. 17/752,248, filed on May 24, 2022, now Pat. No. 11,628,746.

(51) Int. Cl.
| | |
|---|---|
| *B60L 58/26* | (2019.01) |
| *B60L 53/18* | (2019.01) |
| *B64D 13/08* | (2006.01) |
| *B64F 1/36* | (2017.01) |
| *H02J 7/00* | (2006.01) |
| *B64C 29/00* | (2006.01) |

(52) U.S. Cl.
CPC ............... *B60L 58/26* (2019.02); *B60L 53/18* (2019.02); *B64D 13/08* (2013.01); *B64F 1/362* (2013.01); *H02J 7/007194* (2020.01); *B60L 2200/10* (2013.01); *B64C 29/0008* (2013.01)

(58) Field of Classification Search
CPC ...................................................... B60L 58/26
USPC ...................................................... 320/109
See application file for complete search history.

(56) References Cited

U.S. PATENT DOCUMENTS

| | | | |
|---|---|---|---|
| 9,873,408 B2 | 1/2018 | Capizzo | |
| 11,091,276 B2 | 8/2021 | Clermont et al. | |
| 11,858,370 B2 * | 1/2024 | Matsuyama | ............ B60L 50/60 |
| 2010/0013433 A1 | 1/2010 | Baxter et al. | |
| 2013/0320920 A1 * | 12/2013 | Jefferies | ............ G08B 13/1418 |
| | | | 320/109 |
| 2014/0062698 A1 | 3/2014 | Fawcett | |
| 2014/0106586 A1 | 4/2014 | Boeck et al. | |
| 2014/0111158 A1 | 4/2014 | Kinomura et al. | |

(Continued)

*Primary Examiner* — Jerry D Robbins
(74) *Attorney, Agent, or Firm* — Hoffman Warnick LLC

(57) ABSTRACT

A ground service system for an electric aircraft is disclosed. The system includes a charging module configured to charge a battery of an electric aircraft. The charging module includes a charging cable electrically connected to an energy source. The system includes a cooling module configured to regulate a temperature of the battery. The cooling module includes a cooling cable configured to carry a coolant. The system also includes a cabin soak module configured to provide a cabin soak coolant to a cabin of the electric aircraft. The cabin soak module includes a cabin soak cable configured to carry a fluid.

20 Claims, 6 Drawing Sheets

(56) References Cited

U.S. PATENT DOCUMENTS

| | | | |
|---|---|---|---|
| 2016/0001895 A1* | 1/2016 | Tengman | B64F 1/364 |
| | | | 165/248 |
| 2016/0121747 A1* | 5/2016 | Jefferies | B60L 53/16 |
| | | | 320/109 |
| 2016/0264010 A1 | 9/2016 | Boyer et al. | |
| 2017/0106724 A1* | 4/2017 | Porras | H01M 10/44 |
| 2020/0301448 A1 | 9/2020 | Di Benedetto et al. | |
| 2020/0303788 A1 | 9/2020 | Rheaume | |
| 2021/0053689 A1* | 2/2021 | Lynn | H01M 10/486 |
| 2021/0061490 A1* | 3/2021 | Heironimus | B60L 58/26 |
| 2021/0284357 A1* | 9/2021 | Villa | B64F 1/36 |
| 2021/0347489 A1* | 11/2021 | Learn | B64F 1/362 |
| 2023/0365017 A1* | 11/2023 | Oi | B60L 53/54 |
| 2023/0406070 A1* | 12/2023 | Zheng | B60H 1/2218 |

\* cited by examiner

US 12,065,059 B2

GROUND SERVICE SYSTEMS AND DEVICES FOR AN ELECTRIC AIRCRAFT

CROSS-REFERENCE TO RELATED APPLICATIONS

This application is a continuation of Non-provisional application Ser. No. 17/752,248 filed on May 24, 2022, and entitled "GROUND SERVICE SYSTEMS AND DEVICES FOR AN ELECTRIC AIRCRAFT," the entirety of which is incorporated herein by reference.

FIELD OF THE INVENTION

The present invention generally relates to the field of electric aircraft service stations. In particular, the present invention is directed to a ground service system and charging module for an electric aircraft.

BACKGROUND

Servicing electric aircraft in preparation for flight can be timely and inefficient. Charging a battery of an electric aircraft can cause the battery to overheat and the cabin temperature may be uncomfortable.

SUMMARY OF THE DISCLOSURE

In an aspect, a ground service system for an electric aircraft includes a charging module configured to charge a battery of an electric aircraft, the charging module including a charging cable electrically connected to an energy source. The system further includes a cooling module configured to regulate a temperature of the battery, the cooling module including a cooling cable configured to carry a coolant. The system also including a cabin soak module configured to provide a cabin soak coolant to a cabin of the electric aircraft, the cabin soak module including a cabin soak cable configured to carry a fluid. The system also including a charging controller communicatively connected to the charging module.

In another aspect, a charging module configured to charge a battery of an electric aircraft, the charging module including a charging cable electrically connected to an energy source and a charging connector including a communication pin, and a charging controller, where the charging controller is configured to transmit at least a signal to a flight controller inside the electric aircraft using the communication pin.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
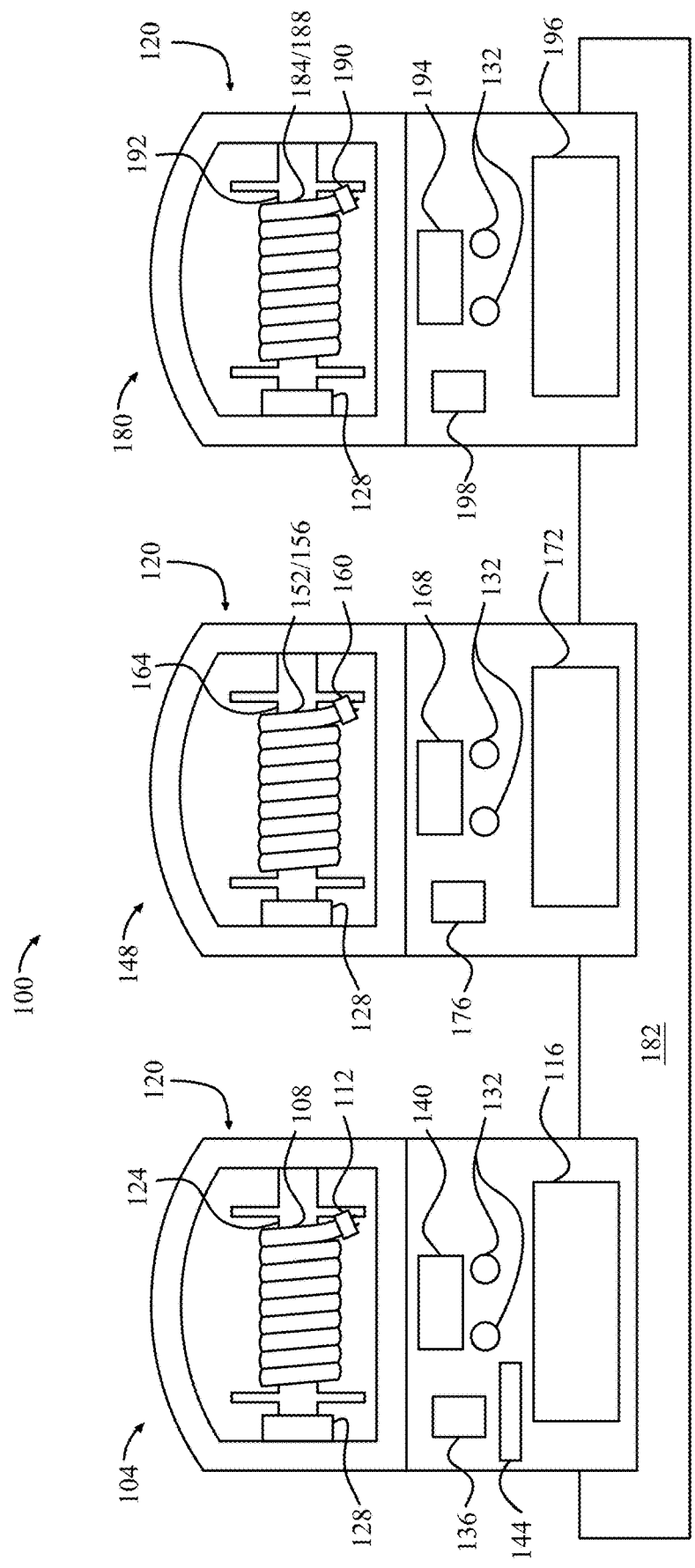
FIG. 1 is a depiction of an exemplary embodiment of a system for an electric aircraft charger with a reel button for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Described herein is a ground service system for an electric aircraft. The system includes a charging module configured to charge a battery of an electric aircraft. The charging module includes a charging cable electrically connected to an energy source and a charging cable reel configured to hold the charging cable. The system includes a cooling module configured to regulate a temperature of the battery. The cooling module includes a cooling cable configured to carry a coolant and a cooling cable reel configured to hold the cooling cable. The system also includes a cabin soak module configured to provide a cabin soak coolant to a cabin of the electric aircraft. The cabin soak module includes a cabin soak cable configured to carry a fluid and a cabin soak reel configured to hold the cabin soak cable. The charging module, the cooling module, and the cabin soak module may be configured to communicate with one another. The system may include a housing with docking stations to receive each of the charging module, the cooling module, and the cabin soak module.

As used in this disclosure, "paying out" a cable is increasing a free length of a cable, i.e., increasing slack in the cable. As used in this disclosure, a "free length of cable" is a length of cable that is external to a housing of the cable such as a storage device. In some cases, paying out cable may actually move a free end of cable, for example if the cable is sufficiently rigid. Alternatively or additionally, paying out a cable may increase a usable length of a cable. Paying out may be referred to in this disclosure as unspooling, without necessarily limiting a meaning of the term, for example to a device having a spool of cable. Paying out may also be referred to in this disclosure as extending. Conversely, as used in this disclosure, "paying in" a cable refers to decreasing a free length of a cable, i.e., decreasing slack in the cable. In some cases, paying in a cable may retract a free end toward a housing and/or reel. Alternatively or additionally, paying in a cable may just decrease a usable length of a cable. Paying in may be referred to in this disclosure as unspooling, without necessarily limiting a meaning of the term, for example to a device having a spool of cable.

Now referring to FIG. 1, a ground service system for an electric aircraft is illustrated. System 100 may include a charging module 104 configured to charge a battery of the electric aircraft. As used in this disclosure, a "charging module" is a device configured to charge a battery. As used in this disclosure, a "battery" is a source of stored electrical power. A battery may include, for example, one or more battery cells, one or more battery modules, and/or one or more battery packs configured to provide electrical power to an electric aircraft and/or an aircraft electrical subsystem. As a non-limiting example, electric aircraft maybe capable of vertical takeoff and landing (VTOL) or conventional takeoff and landing (CTOL). As another non-limiting example, the electric aircraft may be capable of both VTOL and CTOL. As a non-limiting example, electric aircraft may be capable of edgewise flight. As a non-limiting example, electric aircraft may be able to hover. Electric aircraft may include a variety of electric propulsion devices; including, as non-limiting examples, pushers, pullers, lift devices, and the like. Electric aircraft may include electric aircraft illustrated in FIG. 4.

Charging module 104 may include a charging cable 108, cable storage device 120, rotation mechanism 128, and reel button 120. A "charging cable," for the purposes of this disclosure is a conductor or conductors adapted to carry power for the purpose of charging an electronic device, such as an electric aircraft and/or component thereof. Charging cable 108 is configured to carry electricity. In some embodiments, charging cable 108 may include a charging connector 112 in which the charging cable 108 carries AC and/or DC power to charging connector 112. Charging cable 108 may include a coating, wherein the coating surrounds the conductor or conductors of charging cable 108. One of ordinary skill in the art, after having reviewed the entirety of this disclosure, would appreciate that a variety of coatings are suitable for use in charging cable 108. As a non-limiting example, the coating of charging cable 108 may comprise rubber. As another non-limiting example, the coating of charging cable 108 may comprise nylon. Charging cable 108 may be a variety of lengths depending on the length required by the specific implementation. As a non-limiting example, charging cable 108 may be 10 feet. As another non-limiting example, charging cable 108 may be 25 feet. As yet another non-limiting example, charging cable 108 may be 50 feet or any other length. Charging cable 108 may include, without limitation, a constant voltage charger, a constant current charger, a taper current charger, a pulsed current charger, a negative pulse charger, an IUI charger, a trickle charger, a float charger, a random charger, and the like, among others. Charging cable 108 may include any component configured to link an electric aircraft to the connector, charging connector 112 or charger. Charging cable 108 may be consistent with any charger disclosed in U.S. patent application Ser. No. 17/736,574, filed May 4, 2022, and titled "METHODS AND SYSTEMS FOR CHARGING AN ELECTRIC AIRCRAFT INCLUDING A HORIZONTAL CABLE ARRANGEMENT." Charging module 104 may be configured to charge battery in electric aircraft. Battery may be housed in electric aircraft. Battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Charging module 104 may be consistent with disclosure of one or more features of electric aircraft charging system described in in U.S. patent application Ser. No. 17/736,530, filed May 4, 2022, and titled "SYSTEM FOR AN ELECTRIC AIRCRAFT CHARGING WITH A CABLE REEL".

Still referring to FIG. 1, charging cable 108 may be electrically connected to an energy source 116. "Electrically connected," for the purposes of this disclosure, means a connection such that electricity can be transferred over the connection. Charging module 104 may be in contact with the ground. In some embodiments, charging module 104 may be fixed to another structure.

With continued reference to FIG. 1, charging module 104 may include energy source 116. An "energy source," for the purposes of this disclosure, is a source of electrical power. In some embodiments, energy source 116 may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, energy source 116 need not be made up of only a single electrochemical cell, it can consist of several electrochemical cells wired in series or in parallel. In other embodiments, energy source 116 may be a connection to the power grid. For example, in some non-limiting embodiments, energy source 116 may include a connection to a grid power component. Grid power component may be connected to an external electrical power grid. In some other embodiments, the external power grid may be used to charge batteries, for example, when energy source 116 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Some components of system 100 may be consistent with the charger disclosed in U.S. application Ser. No. 17/477,987 filed on Sep. 17, 2021, titled "Systems and Methods for Adaptive Electric aircraft," the entirety of which is hereby incorporated by reference. Additionally, some components of system 100 may be consistent with the charger disclosed in U.S. application Ser. No. 17/515,448 filed on Oct. 31, 2021, titled "Systems and Methods for an Immediate Shutdown of an Electric aircraft Charger," the entirety of which is hereby incorporated by reference.

With continued reference to FIG. 1, charging connector 112 may include a variety of pins adapted to mate with a charging port disposed on electric aircraft. Pins may include mating components. As used in this disclosure, a "mating component" is a component that is configured to mate with at least another component, for example in a certain (i.e. mated) configuration. For the purposes of this disclosure, a "pin" may be any type of electrical connector. An electrical connector is a device used to join electrical conductors to create a circuit. As a non-limiting example, in some embodiments, any pin of charging connector 112 may be the male component of a pin and socket connector. In other embodiments, any pin of charging connector 112 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector 112 may include a locking mechanism. For instance, as a non-limiting example, any pin of charging connector 112 may include a locking mechanism to lock the pins in place. The pin or pins of charging connector 112 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

With continued reference to FIG. 1, in some embodiments, charging connector 112 may include a DC pin. DC pin supplies DC power. "DC power," for the purposes of this disclosure refers, to a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector 112 is charging certain types of batteries, DC pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 1, in some embodiments, charging connector 112 may include an AC pin. An AC pin supplies AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, in some embodiments, charging connector 112 may include a ground pin. A ground pin is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

Referring still to FIG. 1, charging module 104 may configured to store charging cable 108 in a cable storage device 120. As used in this disclosure, a "cable storage device" is a compartment or device configured to store a cable. Cable storage device 120 may include a tray to hold a cable. Tray may be retractable for easy access to cable. Cable storage device 120 may include a service loop. Cable storage device 120 may include a charging cable reel 124 configured to hold charging cable 108. For the purposes of this disclosure, a "reel" is a rotary device around which an object may be wrapped. Charging cable reel 124 may be rotatably mounted to charging module 104. For the purposes of this disclosure, "rotatably mounted" means mounted such that the mounted object may rotate with respect to the object that the mounted object is mounted on. Additionally, when charging cable 108 is in a stowed configuration, the charging cable 108 is wound around charging cable reel 124. In the stowed configuration, charging cable 108 need not be completely wound around charging cable reel 124. As a non-limiting example, a portion of charging cable 108 may hang free from charging cable reel 124 even when charging cable 108 is in the stowed configuration.

With continued reference to FIG. 1, cable storage device 120 may include a rotation mechanism 128. A "rotation mechanism," for the purposes of this disclosure is a mechanism that is configured to cause another object to undergo rotary motion. As a non-limiting example, rotation mechanism 128 may include a rotary actuator. As a non-limiting example, rotation mechanism 128 may include an electric motor. As another non-limiting example, rotation mechanism 128 may include a servomotor. As yet another non-limiting example, rotation mechanism 128 may include a stepper motor. Rotation mechanism 128 may be configured to pay out and/or pay in charging cable 108. In some embodiments, rotation mechanism 128 may include a compliant element. For the purposes of this disclosure, a "compliant element" is an element that creates force through elastic deformation. As a non-limiting example, rotation mechanism 128 may include a torsional spring, wherein the torsional spring may elastically deform when charging cable reel 124 is rotated in, for example, the forward direction; this would cause the torsional spring to exert torque on charging cable reel 124, causing charging cable reel 124 to rotate in a reverse direction when it has been released. Rotation mechanism 128 is configured to rotate charging cable reel 124 in a reverse direction. In some embodiments, rotation mechanism 128 may be configured to rotate charging cable reel 124 in a forward direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause charging cable 108 to extend, whereas rotating in the reverse direction may cause charging cable 108 to stow, or vice versa. In some embodiments, rotation mechanism 128 may continually rotate charging cable reel 124 when rotation mechanism 128 is enabled. In some embodiments, rotation mechanism 128 may be configured to rotate charging cable reel 124 by a specific number of degrees. In some embodiments, rotation mechanism 128 may be configured to output a specific torque to charging cable reel 124. As a non-limiting example, this may be the case, wherein rotation mechanism 128 is a torque motor. Rotation mechanism 128 may be electrically connected to energy source 116.

Still referring to FIG. 1, rotation mechanism 128 may include a biasing means. Biasing means may include a spring, elastic, torsional spring, or the like. As used in this disclosure a "biasing means" is a mechanism that generates an elastic recoil force when moved or deformed. In an embodiment, biasing means may include a mechanism that generates an elastic recoil force when twisting a material. In another embodiment biasing means may include a mechanism that generates an elastic recoil force when compressing a material. In another embodiment, biasing means may include a mechanism that generates an elastic recoil force when stretching a coiled material. As a non-limiting example a biasing means may be a rubber band and/or other elastic and/or elastomeric material that may compress, stretch, and/or twist such that the rubber band releases stored energy and returns to the original shape.

Still referring to FIG. 1, rotation mechanism 128 may include a winch, or similar, for looping a length of cable and thereby shortening a free length of the cable. Rotation mechanism 128 may be controlled by a reel control 132. Reel control 132 may include one or more inputs, such as buttons, to control pay out and/or pay in of charging cable 108. Rotation mechanism 128 may, for example, retract charging cable 108 into cable storage device 120 when a first button of reel control 132 is pressed. Rotation mechanism 128 may extend charging cable 108 from cable storage device 120 when a second button of reel control 132 is pressed. Reel control 132 may be on charging cable 108, charging connector 112, or any part of charging module 104 such as on cable storage device 120. Rotation mechanism 128 may also comprise a motor to pay out or pay in charging cable 108. A motor may include without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. Motor may receive power from energy source 116. Rotation mechanism 128 may include a compliant energy storage system, for example a spring a weight or the like for retraction as described above.

System 100 may include a charging sensor 136. Charging sensor 136 may include a plurality of sensors. Charging sensor 136 may be included in charging module 104, in electric aircraft, and/or on battery. Charging sensor 136 may be configured to detect condition parameter of battery including a temperature of the battery, which is also called "battery temperature measurement" in this disclosure, and/or a charging state of the battery as discussed below. As used in this disclosure, a "sensor" is a device that is configured to detect an input and/or a phenomenon and transmit information and/or datum related to the detection; sensor may include an electronic sensor, which transmits information and/or datum electronically. Sensor may transmit one or more condition parameters in an electrical signal such as a binary, analog, pulse width modulated, or other signal. For example, and without limitation, charging sensor 136 may transduce a detected phenomenon and/or characteristic of battery, such as, and without limitation, temperature, voltage, current, pressure, temperature, moisture level, and the like, into a sensed signal. A sensor may include one or more sensors and may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. For example, and without limitation, charging sensor 136 may detect and/or measure a condition parameter, such as a temperature, of battery. Additional disclosure related to a battery monitoring system can be found in U.S. patent application Ser. No. 17/529,447 entitled "A MODULE MONITOR UNIT FOR AN ELECTRIC AIRCRAFT BATTERY PACK AND METHODS OF USE," filed on Nov. 18, 2021, the entirety of which in incorporated herein by reference. Charging sensor 136 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, bolometers, and the like. Charging sensor 136 may be a contact or a non-contact sensor. For example, and without limitation, charging sensor 136 may be connected to battery module and/or battery cell of battery. In other embodiments, charging sensor 136 may be remote to battery module and/or battery cell. As used in this disclosure, a "temperature sensor" is a sensor that directly or indirectly measures a parameter and/or characteristic of temperature. Temperature sensor may include temperature sensor may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system.

Temperature, as measured by any number or combinations of sensors, may be measured in Fahrenheit (° F.), Celsius (° C.), Kelvin (° K), or another scale alone or in combination. The temperature measured by temperature sensors may comprise electrical signals, which are transmitted to their appropriate destination wireless or through a wired connection.

With continued reference to FIG. 1, charging module 104 may include a charging control 140. Charging control 140 may include at least a control input to control charging of battery such as, for example, begin charging, pause charging, and stop charging. Charging control 140 may include a control panel. For the purposes of this disclosure, a "control panel" is a panel containing a set of controls for a device. Control panel may include, for example, a display, a rotation toggle, and lift toggle. For the purposes of this disclosure, a "display" is an electronic device for the visual presentation of information. Display may be any type of screen. As non-limiting examples, display may be an LED screen, an LCD screen, an OLED screen, a CRT screen, a DLPT screen, a plasma screen, a cold cathode display, a heated cathode display, a nixie tube display, and the like. Display may be configured to display any relevant information. A person of ordinary skill in the art would appreciate, after having reviewed the entirety of this disclosure, that a variety of information could be displayed on display. In some embodiments, display may display metrics associated with the charging of an electric aircraft. As a non-limiting example, this may include energy transferred. As another non-limiting example, this may include charge time remaining. As another non-limiting example, this may include charge time elapsed. As another non-limiting example, display may include warnings related to the charging of the electric aircraft. For example, temperature warnings or electrical short warnings. Charging control 140 may display a state of charge of battery, such as a current percent the battery is charged, an estimated time to fully charge the battery, and the like. Charging control 140 may be on charging cable 108, charging connector 112, or any part of charging module 104 such as on cable storage device 120.

Still referring to FIG. 1, system 100 may include a controller. Controller 144 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 144 may include a single computing device operating independently, or may include two or more computing device operating in concert, in parallel, sequentially or the like; two or more computing devices may be included together in a single computing device or in two or more computing devices. Controller 144 may interface or communicate with one or more additional devices as described below in further detail via a network interface device. Network interface device may be utilized for connecting controller 144 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 144 may include but is not limited to, for example, a computing device or cluster of computing devices in a first location and a second computing device or cluster of computing devices in a second location. Controller 144 may include one or more computing devices dedicated to data storage, security, distribution of traffic for load balancing, and the like. Controller 144 may distribute one or more computing tasks as described below across a plurality of computing devices of computing device, which may operate in parallel, in series, redundantly, or in any other manner used for distribution of tasks or memory between computing devices. Controller 144 may be implemented using a "shared nothing" architecture in which data is cached at the worker, in an embodiment, this may enable scalability of system 100 and/or computing device.

With continued reference to FIG. 1, controller 144 may be designed and/or configured to perform any method, method step, or sequence of method steps in any embodiment described in this disclosure, in any order and with any degree of repetition. For instance, controller 144 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 144 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Controller 144 may be communicatively connected to charging module 104, charging cable, charging connector 112, and/or charging sensor 136. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, in some embodiments, controller 144 may be included in charging module 104. In some embodiments, charging connector 112 may include a communication pin. A communication pin is an electric connector configured to carry electric signals between components of system 100 and components of an electric aircraft. As a non-limiting example, communication pin may carry signals from a controller in a charging system to a controller onboard an electric aircraft such as a flight controller or battery management controller. A person of ordinary skill in the art would recognize, after having reviewed the entirety of this disclosure, that communication pin could be used to carry a variety of signals between components.

With continued reference to FIG. 1, charging connector 112 may include a variety of additional pins. As a non-limiting example, charging connector 112 may include a proximity detection pin. Proximity detection pin has no current flowing through it when charging connector 112 is not connected to a port. Once charging connector 112 is connected to a port, then proximity detection pin will have current flowing through it, allowing for controller 144 to detect, using this current flow, that the charging connector 112 is connected to a port.

Still referring to FIG. 1, system 100 may include a cooling module 148 configured to regulate a temperature of battery of electric aircraft. As used in this disclosure, a "cooling module" is a device configured to provide cooling to a battery or to a cooling module. Cooling module 148 may include a cooling cable 152 with a cooling channel 156 through which a coolant may flow. Cooling cable 152 may be of any length including, without limitation, ten feet, twenty-five feet, or fifty feet long. A distal end of cooling cable 152 may connect to a cooling connector 160. Cooling connector 160 may be configured to connect to battery in electric aircraft, a battery cooling system in electric aircraft, an outer surface of the electric aircraft such as a cooling port, and/or a compartment within electric aircraft that stores the battery such as a battery bay. As used in this disclosure, a cooling cable "connected to" a component and/or space means that the cooling cable forms a fluid connection to the component and/or space. As used in this disclosure, a "fluid connection" is a connection between components and/or spaces in which fluid may travel between. As used in this disclosure, a "cooling port" is a port on a surface of an aircraft that opens to an internal environment of the aircraft and is configured to receive a cooling device, such as a cooling connector 160. Cooling port may include one or more mating components to securely connect to cooling connector 160. Similar to charging module 104, cooling module 148 may include a cable storage device 120 with a reel, such as cooling cable reel 164, which may house cooling cable 152. Cooling cable 152 reel may be connected to a rotation mechanism 128 configured to rotate the cooling cable reel 164 forward and/or backward to pay out and/or pay in cooling cable 152. Rotation mechanism 128 may be controlled by reel control 132, which may include inputs such as one or more buttons. For example, reel control 132 may include a first button to pay out cooling cable 152 and a second button to pay in the cooling cable 152. Cooling module 148 may include cooling control 168 configured to control a flow of coolant through cooling cable 152. Cooling control 168 may include a control panel. Cooling control 168 may include buttons, switches, slides, a touchscreen, joystick, and the like. In some embodiments, cooling control 168 may include a screen that displays information related to the cooling of battery and/or temperature of battery. For example, and without limitation, screen may display a rate of flow of coolant through cooling cable 152, a temperature of coolant, and/or a temperature of battery being charged. In an exemplary embodiment, a user may actuate, for example, a switch, of cooling control 168 to initiate a cooling of electric aircraft in response to displayed information and/or data on screen of cooling connector 160. Initiating of a cooling of cooling connector 160 may include a coolant source displacing a coolant within cooling channel, as discussed further in this disclosure below. Cooling module 148 may include and/or be connected to a coolant source configured to store coolant and from which coolant may flow through cooling cable 152. Reel control 132 and/or cooling control 168 may be on cooling cable 152, cooling connector 160, or any part of cooling module 148 such as on cable storage device 120.

Cooling channel 156 may have a distal end located at cooling connector 160 and may have a proximal end located at a coolant source 172, as discussed further below in this disclosure. As used in this disclosure, a "cooling channel" is a component with walls that are substantially impermeable to a coolant that contains and/or directs a coolant flow. As used in this disclosure, "coolant" is any flowable heat transfer medium. Coolant may include a fluid, such as a liquid or a gas. Coolant may include a compressible fluid and/or a non-compressible fluid. Coolant may include compressed air, liquid coolant, gas coolant, and the like. Coolant may include nitrogen, ethylene glycol, propylene glycol, and the like. Coolant may include a non-electrically conductive liquid such as a fluorocarbon-based fluid, such as without limitation FLUORINERT from 3M of Saint Paul, Minnesota, USA. In some cases, coolant may include air. As used in this disclosure, a "flow of coolant" is a stream of coolant. In some cases, coolant may include a fluid and coolant flow is a fluid flow. In some cases, cooling channel 156 may include a polymeric tube. In other cases, cooling channel 156 may be an integrated component, such as a molded component created with a mold form. In other cases, cooling channel 156 may be a combination of both an integrated component and a molded component. In one or more embodiments, cooling channel 156 may include any component responsible for the flow of coolant into and/or out of electric aircraft. Cooling channel 156 and/or cooling connector 160 may be configured contact charging cable 108 and/or charging connector 112. Cooling channel 156 may solely cool (e.g., reduce a current temperature) charging connecter such that the coolant flows through or next to the cables within the charging connector 112. For example, and without limitation, cooling channel may reduce the temperature of one or more conductors of charging connector 112. In some embodiments, cooling channel 156 and/or cooling connector 160 may removably attach to charging cable 108 and/or charging connector 112. Cooling channel 156 may include a loop through which coolant may flow. Loop may include a flow of cooled coolant from coolant source 172 to distal end of the cooling channel 156 and a return flow of warmer coolant from the distal end to the coolant source 172 wherein coolant may be cooled. Cooling channel 156 may include any component, such as a cooling sensor 176, responsible for transmitting signals describing a cooling of a battery and/or charging connector 112, such as current temperature, target temperature, and/or target range temperature of battery, charging connector 112, and/or coolant in coolant source 172. Cooling sensor 176 may include at least a temperature sensor. Temperature senor may include a thermocouple, thermistors, negative temperature coefficient (NTC) thermistors, resistance temperature detectors (RTDs) and the like. Cooling channel 156 may assist in rapid charging of an energy source of electric aircraft such that coolant assists in cooling down the electrical components to aid in faster charging. Flow of coolant through cooling channel 156 may be initiated by controller 144. Controller 144 may control pump based on measurements by cooling sensor 176 described in this disclosure. Controller 144 may initiate and/or terminate a flow of coolant through cooling channels 120 as a function of detected data by a sensor such as charging sensor 136, cooling sensor 176, and/or a sensor of electric aircraft, as discussed further below in this disclosure. Cooling module 148 may include a pump configured to control a flow of coolant from coolant source 172 through cooling channel 156 and/or cooling cable 152. Controller 144 may be configured to control pump. For example, controller 144 may be configured to start pump, stop pump, and/or control a flow rate of coolant. Pump may include a substantially constant pressure pump (e.g., centrifugal pump) or a substantially constant flow pump (e.g., positive displacement pump, gear pump, and the like). Pump may be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed Cooling sensor 176 may be included in cooling module 148. Cooling sensor 176 may be in electric aircraft and communicatively connected to cooling module 148. Cooling sensor 176 may include a plurality of sensors. In some embodiments, cooling module 148 may be configured to heat charging cable 108 and/or battery. For example, cooling module 148 may include at least a heater and/or at least a heating pad to heat coolant and/or directly heat charging cable 108. A heated coolant may flow through cooling cable 152 and heat charging cable 108 and/or battery in any manner described in this disclosure related to cooling the charging cable 108 and/or the battery.

In one or more embodiments, cooling cable 152 may be configured to wrap around charging cable 108. In some embodiments, cooling cable 152 may have an opening along an axis of cooling cable 152 in which cooling cable 152 includes an outer wall and a substantially coaxial inner wall, which may be configured to receive and contact charging cable 108. For instance, and without limitation, at least a portion of charging cable 108 may be disposed coaxially within cooling channel 156. In some embodiments, at least a portion of cooling cable 152 may be constructed around at least a portion of charging cable 108. Thus, charging cable 108 may traverse along the center of cooling channel 156 so that coolant may reduce a temperature of the charging cable 108 during charging of electric aircraft. Conductors may all be disposed within cooling channel 156, each separated by an insulator, or conductors may each be disposed within a corresponding cooling channel 156, wherein each cooling channel 156 is in fluidic communication with coolant source 172. In other embodiments, cooling channel 156 may abut one or more conductors to cool conductors. Cooling connector 160 may be configured such that one or more cooling channel make a connection with mating component of electric aircraft port and/or cooling port when cooling connector 160 is mated with electric aircraft port.

Still referring to FIG. 1, cooling channel 156 may be in fluidic communication with coolant source 172. As used in this disclosure, a "coolant source" is an origin, generator, reservoir, or flow producer of coolant. In some cases, a coolant source 172 may include a flow producer, such as a fan and/or a pump. Coolant source 172 may include any of following non-limiting examples, air conditioner, refrigerator, heat exchanger, pump, fan, expansion valve, and the like. In some embodiments, coolant source 172 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 172 comprises a heat transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, controller 144 may be further configured to control a temperature of coolant in cooling cable. For instance, in some cases, cooling sensor 176 may be located within thermal communication with coolant, such that cooling sensor 176 is able to detect, measure, or otherwise quantify temperature of coolant within a certain acceptable level of precision. In some cases, cooling sensor 176 may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to controller 144. Controller 144 may receive coolant temperature signal and control heat transfer between ambient air and coolant as a function of the coolant temperature signal. Controller 144 may use any control method and/or algorithm used in this disclosure to control heat transfer, including without limitation proportional control, proportional-integral control, proportional-integral-derivative control, and the like. In some cases, controller 144 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a range a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, coolant source 172 may be further configured to transfer heat between a heat source, such as without limitation ambient air or chemical energy, such as by way of combustion, and coolant, for example coolant flow. In some cases, coolant source 172 may heat coolant, for example above ambient air temperature, and/or cool coolant, for example below an ambient air temperature. In some cases, coolant source 172 may be powered by electricity, such as by way of one or more electric motors. Alternatively or additionally, coolant source 172 may be powered by a combustion engine, for example a gasoline powered internal combustion engine. In some cases, coolant flow may be configured, such that heat transfer is facilitated between coolant flow and at least a battery, by any methods known and/or described in this disclosure. In some cases, at least a battery may include a plurality of pouch cells. In some cases, heat is transferred between coolant flow and one or more components of at least a pouch cell, including without limitation electrical tabs, pouch and the like. In some cases, coolant flow may be configured to facilitate heat transfer between the coolant flow and at least a conductor of electric aircraft, including without limitation electrical buses within at least a battery.

Still referring to FIG. 1, in some embodiments, cooling using coolant source 172 may occur synchronously and/or asynchronously with charging. For example, in some case, coolant source 172 may be configured to provide a flow of coolant prior to charging battery of electric aircraft. In some embodiments, cooling channel 156 may facilitate fluidic and/or thermal communication with coolant source 172 and at least a battery when connector is connected to a port of electric aircraft, such as cooling port. Alternatively and/or additionally, cooling channel 156 may facilitate fluidic and/or thermal communication with coolant source 172 and a cabin and/or cargo-space of aircraft when cooling connector 160 is connected to cooling port. In some cases, a plurality of cooling channels 128, coolant sources 136, and/or connectors may be used to connect to multiple components of an electric aircraft. In some cases, coolant source 172 may provide conditioned air in order to control an environmental temperature within an electric aircraft, such as an aircraft, for example without limitation for cargo, passengers, and/or crew. In some cases, coolant source 172 may pre-condition at least a vehicle battery. As used in this disclosure, "pre-conditioning" is an act of affecting a characteristic of a battery, for example battery temperature, pressure, humidity, swell, and the like, substantially prior to charging. For example and without limitation, coolant source 172 may be configured to pre-condition at least a battery prior to charging, by providing a coolant flow to the at least a battery and raising and/or lowering temperature of the at least a battery. As a further non-limiting example, pre-conditioning may occur for a predetermined time prior to charging (e.g., 1 min, 10 min, 1 hour, 4 hours, and the like). Alternatively or additionally, pre-conditioning may be feedback controlled, by way of at least a charging sensor 136, and occur until or for a predetermined time after a certain condition has been met, such as without limitation when at least a battery is within a desired temperature range. In some cases, coolant source 172 may be configured to pre-condition any space or component within a vehicle, such as an aircraft, including without limitation cargo space and cabin. In some cases, and without limitation, coolant source 172 may provide cooling to at least a battery after charging the at least a battery. In some cases, and without limitation, at least a machine-learning process may be used to determine and/or optimize parameters associated with cooling at least a battery. In some non-limiting cases, controller 144 may use at least a machine-learning process to optimize cooling time relative of current charging metrics, for example charging battery parameters and/or charging sensor 136 signals. Coolant source 172 may include any computing device described in this disclosure.

Still referring to FIG. 1, system 100 may include a cabin soak module 180 configured to provide a coolant, such as cabin soak coolant, to a cabin of electric aircraft. As used in this disclosure, a "cabin soak module" is a device configured to cool and/or heat a cabin. As used in this disclosure, a "cabin" is an area in an aircraft in which passengers travel. Cabin soak module 180 may be configured to heat and/or cool a cabin area of electric aircraft. Cabin soak module 180 may include a cabin soak cable 184 with a cabin soak channel 188 configured to carry a fluid such as a coolant. Cabin soak cable 184 may be of any length including, without limitation, ten feet, twenty-five feet, or fifty feet long. A distal end of cabin soak cable 184 may connect to a cabin soak connector 190. Cabin soak connector 190 may be configured to connect to an outer surface of the electric aircraft such as a cabin soak port. As used in this disclosure, a "cabin soak port" is a port on a surface of an aircraft that provides access to a cabin of the aircraft and is configured to receive a cooling device, such as a cabin soak connector 190. Cabin soak port may include one or more mating components to securely connect to cabin soak connector 190. Similar to charging module 104, cabin soak module 180 may include a cable storage device 120 with a reel, such as cabin soak cable reel 192, which may house cabin soak cable 184. Cabin soak cable reel 192 may be connected to a rotation mechanism 128 configured to rotate the cabin soak cable reel 192 forward and/or backward to pay out and/or pay in cabin soak cable 184. Rotation mechanism 128 may be controlled by reel control 132, which may include inputs such as one or more buttons. For example, reel control 132 may include a first button to pay out cabin soak cable 184 and a second button to pay in the cabin soak cable 184. Cabin soak module 180 may include cabin soak control 194 configured to control a flow of coolant through cabin soak cable 184. Cabin soak control 194 may include a control panel. Cabin soak control 194 may include buttons, switches, slides, a touchscreen, joystick, and the like. In some embodiments, cabin soak control 194 may include a screen that displays information related to the cabin soak of coolant and/or temperature of cabin. For example, and without limitation, screen may display a rate of flow of coolant through cabin soak cable 184, a temperature of coolant, and/or a temperature of cabin. In an exemplary embodiment, a user may actuate, for example, a switch, of cabin soak control 194 to initiate a cabin soak in response to displayed information and/or data on screen of cabin soak connector 190. Initiating of a cabin soak of one or more embodiments of cabin soak connector 190 may include a cabin soak source displacing a coolant within cabin soak channel, as discussed further in this disclosure below. Cabin soak module 180 may include and/or be connected to a cabin soak source configured to store coolant and from which coolant may flow through cabin soak cable 184. Reel control 132 and/or cabin soak control 194 may be on cabin soak cable 184, cabin soak connector 190, or any part of cabin soak module 180 such as on cable storage device 120.

Cabin soak channel 188 may have a distal end located at cabin soak connector 190 and may have a proximal end located at a cabin soak source 196, as discussed further below in this disclosure. As used in this disclosure, a "cabin soak channel" is a component that is substantially impermeable to a coolant and contains and/or directs a coolant flow. As discussed above, coolant may include a fluid, such as a liquid or a gas. Coolant may include a compressible fluid and/or a non-compressible fluid. Coolant may include air, compressed air, liquid coolant, gas coolant, and the like. Coolant may include a non-electrically conductive liquid such as a fluorocarbon-based fluid, such as without limitation Fluorinert™ from 3M of Saint Paul, Minnesota, USA. In some cases, coolant may include air. In some cases, coolant may include a fluid and coolant flow is a fluid flow. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. In some cases, cabin soak channel 188 may include a polymeric tube. In other cases, cabin soak channel 188 may be an integrated component, such as a molded component disposed the cabin soak channel 188 created using a mold form. In other cases, cabin soak channel 188 may be a combination of both an integrated component and a molded component. In one or more embodiments, cabin soak channel 188 may include any component responsible for the flow of coolant into and/or out of electric aircraft. Cabin soak channel 188 may include any component, such as a cabin soak sensor 198, responsible for transmitting signals describing a cooling of cabin of electric aircraft, such as cooling requirements, current temperature, maximum and/or minimum temperature, and the like. Flow of coolant through cabin soak channel 188 may be initiated by controller 144. In some embodiments, cabin soak module 180 may include cabin soak sensor 198 to measure a temperature of cabin, such as a thermometer. Controller 144 may initiate and/or terminate a flow of coolant through cabin soak channel 188 as a function of detected data by cabin soak sensor 198. Cabin soak sensor 198 may be located in electric aircraft and controller 144 may be configured to receive a signal from the cabin soak sensor 198. Cabin soak connector 190 may be configured such that one or more cabin soak channel make a connection with mating component of electric aircraft port and/or cabin soak port when cabin soak connector 190 is mated with electric aircraft port. Cabin soak module 180 may include at least a heater and/or at least a heating pad, which may heat coolant. For example, cabin soak module 180 may heat air and flow the heated air into cabin to heat cabin. Cabin soak module 180 may flow coolant into cabin that is colder than ambient air to cool cabin.

Cabin soak channel 188 may be in fluidic communication with cabin soak source 196. As used in this disclosure, a "cabin soak source" is an origin, generator, reservoir, or flow producer of coolant. In some cases, a coolant source 172 may include a flow producer, such as a fan and/or a pump. Coolant source 172 may include any of following non-limiting examples, air conditioner, refrigerator, heat exchanger, pump, fan, expansion valve, and the like. In some embodiments, coolant source 172 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 172 comprises a heat transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. Cabin soak module 180 may include a heat exchanger configured to dissipate heat absorbed by coolant. As used in this disclosure, a "heat exchanger" is a component and/or system used to transfer thermal energy, such as heat, from one medium to another. Heat exchanger may be a radiator. Heat exchanger may be configured to exchange heat between coolant and a fluid, such as air, which may then be used to air condition cabin. Heat exchanger may be configured to reduce a temperature of coolant to below ambient air temperature. In one or more embodiments, heat exchanger 136 may include a cross-flow, parallel-flow, or counter-flow heat exchanger. In one or more embodiments, heat exchanger may include a finned tube heat exchanger, a plate fin heat exchanger, a plate heat exchanger, a helical-coil heat exchanger, and the like. In some versions, controller 144 may be further configured to control a temperature of coolant. For instance, in some cases, cabin soak sensor 198 may be located within thermal communication with coolant, such that cabin soak sensor 198 is able to detect, measure, or otherwise quantify temperature of coolant within a certain acceptable level of precision. In some cases, cabin soak sensor 198 may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to controller 144. Controller 144 may receive coolant temperature signal and control heat transfer between ambient air and coolant as a function of the coolant temperature signal. Controller 144 may use any control method and/or algorithm used in this disclosure to control heat transfer, including without limitation proportional control, proportional-integral control, proportional-integral-derivative control, and the like. In some cases, controller 144 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a range a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, cabin soak source 196 may be further configured to transfer heat between a heat source, such as without limitation ambient air or chemical energy, such as by way of combustion, and coolant, for example coolant flow. In some cases, cabin soak source 196 may heat coolant, for example above ambient air temperature, and/or cool coolant, for example below an ambient air temperature. In some cases, cabin soak source 196 may be powered by electricity, such as by way of one or more electric motors. Alternatively or additionally, cabin soak source 196 may be powered by a combustion engine, for example a gasoline powered internal combustion engine.

Still referring to FIG. 1, in some embodiments, cabin soaking may occur synchronously and/or asynchronously with charging. For example, in some case, cabin soak source 196 may be configured to provide a flow of coolant prior to charging battery of electric aircraft, during charging of the battery, and/or after charging the battery. In some embodiments, cabin soak channel 188 may facilitate fluidic and/or thermal communication with cabin soak source 196 and cabin when connector is connected to a port of electric aircraft, such as cabin soak port. Alternatively and/or additionally, cabin soak channel 188 may facilitate fluidic and/or thermal communication with cabin soak source 196 and a cabin and/or cargo-space of aircraft when cabin soak connector 190 is connected to cabin soak port. In some cases, a plurality of cabin soak channels 128, cabin soak sources 136, and/or connectors may be used to connect to multiple components of an electric aircraft. In some cases, cabin soak source 196 may provide conditioned air in order to control an environmental temperature within an electric aircraft, such as an aircraft, for example without limitation for cargo, passengers, and/or crew. Cabin soak source 196 may include any computing device described in this disclosure.

As a non-limiting example, charging module 104, cooling module 148, and/or cabin soak module 180 may be fixed to a helipad. As another non-limiting example, charging module 104, cooling module 148, and/or cabin soak module 180 may be fixed to the ground. As another non-limiting example, charging module 104, cooling module 148, and/or cabin soak module 180 may be fixed to a cart, wherein the cart may have wheels. One of ordinary skill in the art would appreciate, after having reviewed the entirety of this disclosure, that charging module 104, cooling module 148, and/or cabin soak module 180 may be fixed to a variety of structures or objects depending on the location and/or support requirements of system 100. Charging module 104, cooling module 148, and/or cabin soak module 180 may be located on or proximal to a helideck or on or near the ground. In this disclosure, a "helideck" is a purpose-built helicopter landing area located near charging module 104, cooling module 148, and/or cabin soak module 180 and may be in electric communication with it. Helideck may be elevated or at ground level. Helideck may be made from any suitable material and may be any dimension. Helideck may include a designated area for the electric aircraft to land and takeoff on. Alternatively, charging module 104, cooling module 148, and/or cabin soak module 180 may be located on a vehicle, such as a cart or a truck, thereby allowing charging module 104, cooling module 148, and/or cabin soak module 180 to be mobile and moved to an electric aircraft.

Still referring to FIG. 1, charging module 104, cooling module 148, and/or cabin soak module 180 may be communicatively connected. In some embodiments, charging module 104, cooling module 148, and/or cabin soak module 180 may be removably attached to a ground service system housing 182. As used in this disclosure, a "housing" is a physical component in which other internal components may be disposed on or at least partially within. Ground service system housing 182 may include a platform, moveable cart, cage, box, frame, and/or the like. Ground service system housing 182 may include at least a retractable drawer. Housing may include one or more doors that are configured to cover charging module 104, cooling module 148, and/or cabin soak module 180 when not in use. Ground service system housing 182 may include one or more receivers configured to electrically connect ground service system housing 182 to charging module 104, cooling module 148, and/or cabin soak module 180. As used in this disclosure, a "receiver" is a physical docking station that includes one or more contacts to electrically and/or communicatively connect to a docked device, such as a module. Charging module 104, cooling module 148, and/or cabin soak module 180 may be electrically connected to a power grid through ground service system housing 182. Receivers may be configured to communicatively connect via wire charging module 104, cooling module 148, and/or cabin soak module 180. For example, receivers may communicatively connect charging module 104, cooling module 148, and/or cabin soak module 180 via, SCSI, advanced technology attachment (ATA), serial ATA, universal serial bus (USB), CAN bus, IEEE 1394 (FIREWIRE), and any combinations thereof. In some embodiments, charging module 104, cooling module 148, and/or cabin soak module 180 may be wirelessly communicatively connected such as, for example, via Bluetooth®. In some embodiments, controller 144 may be included in ground service system housing 182 separate from charging module 104, cooling module 148, and/or cabin soak module 180. Charing module 104, cooling module 148, and/or cabin soak module 180 may be communicatively connected. Controller 144 may be connected to charging module 104, cooling module 148, and/or cabin soak module 180 via receivers. Charing module 104, cooling module 148, and/or cabin soak module 180 may communicate with each other information identifying when each module is operating, settings of each module, and/or measurements received from sensors. For example, charging module 104 and/or controller 144 may transmit at least a signal to cooling module 148 and/or cabin soak module 180 of when charging module 104 is in use, estimated time remaining to fully charge battery, and/or measurements received from charging sensor 136 such as state of charge of battery and/or battery temperature. Cooling module 148 and/or controller 144 may transmit at least a signal to charging module 104 and/or cabin soak module 180 of when cooling module 148 is in use and/or measurements received from cooling sensor 176 such as coolant temperature, battery temperature, and the like. Cabin soak module 180 and/or controller 144 may transmit at least a signal to charging module 104 and/or cooling module 148 of when cabin soak module is in use, estimate time for cabin to reach a target temperature, and/or or measurements from cabin soak sensor 198 such as temperature of cabin. Operation of charging module 104, cooling module 148, and/or cabin soak module 180 may be based on communication and/or at least a signal received. For example, and without limitation, cooling module 148 may alter a temperature of coolant based on battery temperature and/or use of charging module 104. Cooling module 148 may be configured to automatically begin cooling battery and/or charging module 104 when charging module 104 is in use, not in use and/or when the battery is above a specified temperature. Cabin soak module 180 may begin operation when charging module 104 is charging battery.

With continued reference to FIG. 1, charging module 104, cooling module 148, and/or cabin soak module 180 may be mixed and matched according to a user's needs. For example, in warm climates, an embodiment of cabin soak module 180 that provide only cooling to a cabin may be used instead of an embodiment of the cabin soak module 180 that also is configured to heat the cabin.

With continued reference to FIG. 1, controller 144 may be configured to control one or more electrical charging current within charging cable 108 and coolant flows within cooling channel 156 and cabin soak channel. For example, controller 144 may be configured to control one or more of coolant source 172 and/or charging battery. In some embodiments controller 144 may control coolant source 172 and/or charging battery according to a control signal. As used in this disclosure, "control signal" is any transmission from controller 144 to a subsystem that may affect performance of subsystem. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal may include commands to operate one or more of coolant source 172, cabin soak source 196, and/or charging battery. For example, in some cases, coolant source 172 and/or cabin soak source 196 may include a valve to control coolant flow and controller 144 may be configured to control the valve by way of control signal. In some cases, coolant source 172 and/or cabin soak source 196 may include a flow source (e.g., a pump, a fan, or the like) and controller 144 may be configured to control the flow source by way of control signal. In some cases, coolant source 172 and/or cabin soak source 196 may be configured to control a temperature of coolant and controller 144 may be configured to control a coolant temperature setpoint or range by way of control signal.

Figure 2A:
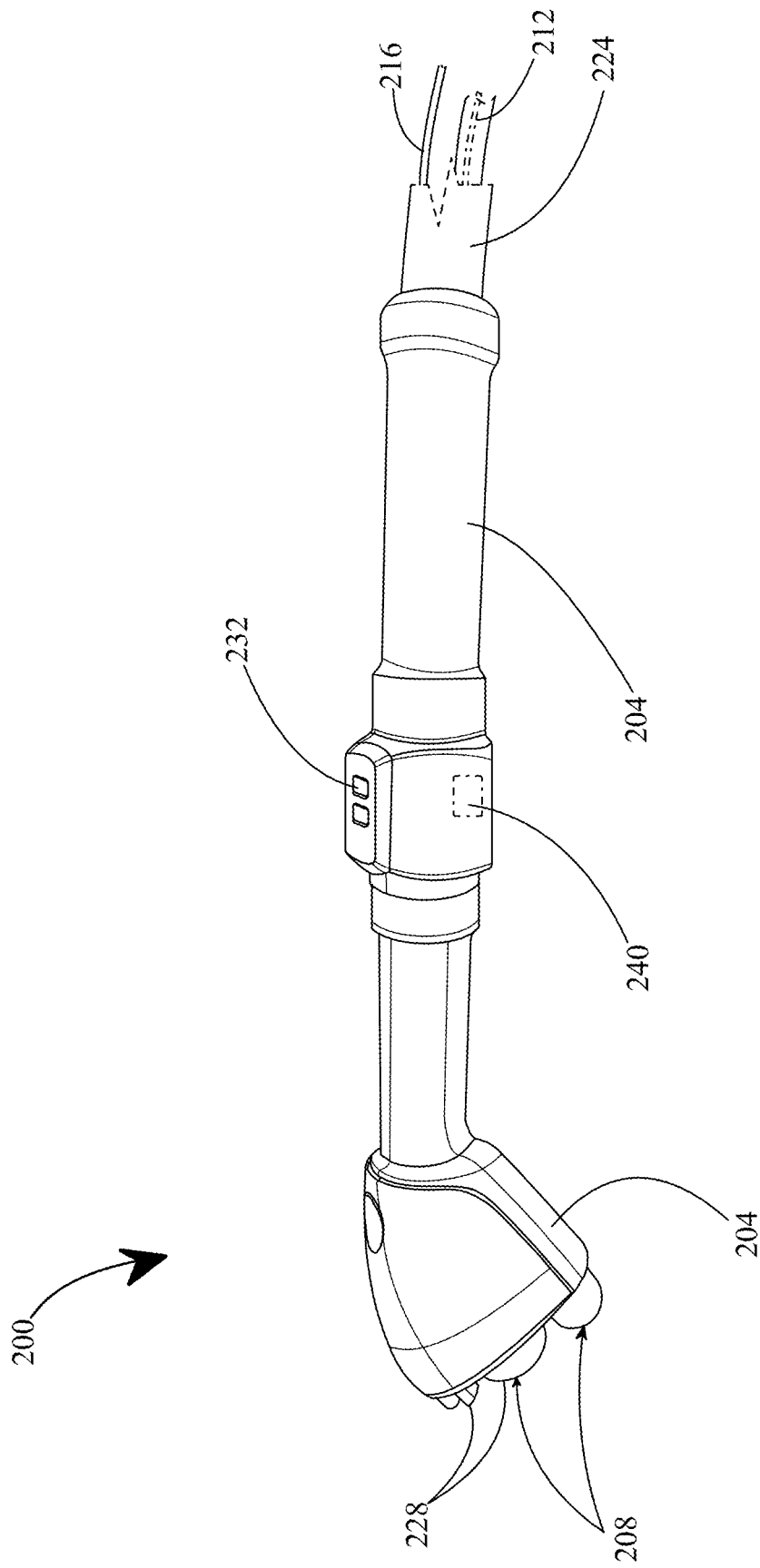
FIGS. 2A and 2B are exemplary schematics of an exemplary embodiment of a charging connector in accordance with one or more embodiments of the present disclosure.
Figure 2B:
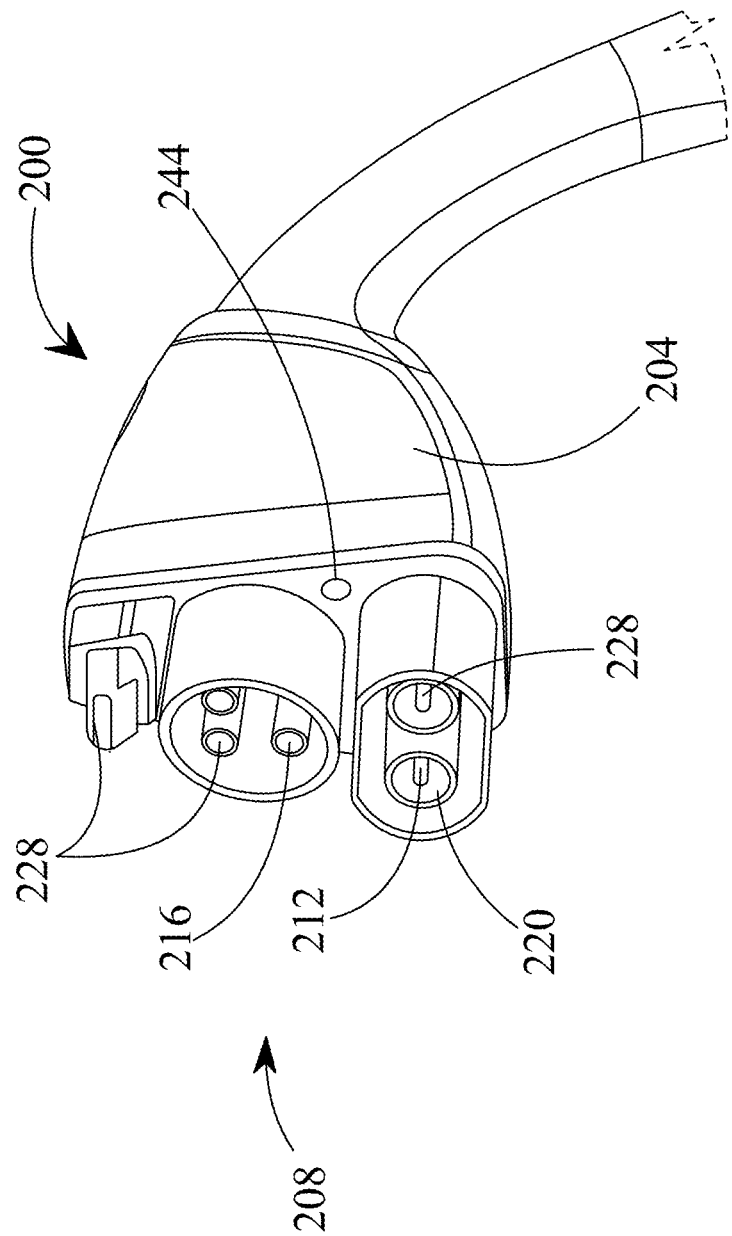

Now referring to FIGS. 2A and 2B, an exemplary embodiment of a charging connector 100 is illustrated. As shown in FIG. 2A, charging connector 200 (also referred to herein as a "connector") facilitates transfer of electrical power between a power source of a charging station and an electric aircraft, such as a power source of the electric aircraft and/or electrical systems of the electric aircraft. As used in this disclosure, "charging" refers to a process of increasing energy stored within an energy source. In some cases, and without limitation, an energy source may include a battery and charging may include providing electrical power, such as an electrical current, to the battery.

In one or more embodiments, and still referring to FIG. 2A, connector 200 may include a distal end of a flexible tether 224 or a bundle of tethers, e.g., hose, tubing, cables, wires, and the like, attached to a charging unit, such as a charging station or charger. Connector 200 is configured to connect charging unit to an electric aircraft to create an electrical communication between charging unit and electric aircraft, as discussed further in this disclosure. Connector 200 may be configured to removably attach to a port of electric aircraft using, for example, a mating component 228. As used in this disclosure, a "port" is an interface for example of an interface configured to receive another component or an interface configured to transmit and/or receive signal on a computing device. For example, and without limitation, in the case of an electric aircraft port, the port interfaces with a number of conductors 208 and/or a cooling channel 220 by way of receiving connector 200. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 2A, connector 200 may include a casing 204. In some cases, casing 204 may protect internal components of connector 200. Casing 204 may be made from various materials, such as metal alloy, aluminum, steel, plastic, synthetic material, semi-synthetic material, polymer, and the like. In some embodiments, casing 204 may be monolithic. In other embodiments, casing 204 may include a plurality of assembled components. Casing 204 and/or connector 200 may be configured to mate with a port of an electric aircraft using a mating component 228. Mating component 228 may include a mechanical or electromechanical mechanism described in this disclosure. For example, without limitation mating may include an electromechanical device used to join electrical conductors and create an electrical circuit. In some cases, mating component 228 may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 200. In some cases, mate may be lockable. In one or more embodiments, casing 204 may include controls 232. Controls 232 may be actuated by a user to initiate, terminate, and/or modify parameters charging. For example, and without limitation, a button of controls 232 may be depressed by a user to initiate a transfer of electrical power from charging unit to electric aircraft. Controls 232 may include buttons, switches, slides, a touchscreen, joystick, and the like. In some embodiments, controls 232 may include a screen that displays information related to the charging of an energy source. For example, and without limitation, screen may display an amperage or voltage of electrical power being transferred to energy source of electric aircraft. Screen may also display a calculated amount of time until energy source is charged to a desired amount (e.g., desired state of charge). Screen may also display data detected by components, such as a sensor, of connector and/or electric aircraft. For example, and without limitation, screen may display a temperature of an energy source of electric aircraft. In an exemplary embodiment, a user may actuate, for example, a switch, of control 232 to initiate a cooling of a component of connector 200 and/or electric aircraft in response to displayed information and/or data on screen of connector 200. Initiating of a cooling of one or more embodiments of connector 200 may include a coolant source displacing a coolant within a cooling channel, as discussed further in this disclosure below. Controlling a transmission of electrical power and/or charging of an electric aircraft using a connector may be consistent with charging described in U.S. Nonprovisional application Ser. No. 17/405,840, filed on Aug. 18, 2021, and entitled "CONNECTOR AND METHODS OF USE FOR CHARGING AN ELECTRIC AIRCRAFT", U.S. Nonprovisional application Ser. No. 17/407,358, filed on Aug. 20, 2021, and entitled "CONNECTOR AND METHOD FOR USE FOR AUTHORIZING BATTERY CHARGING FOR AN ELECTRIC AIRCRAFT", U.S. Nonprovisional application Ser. No. 17/515,508, filed on Oct. 31, 2021, and entitled "CONNECTOR WITH AMBIENCE MONITORING CAPABILITY AND METHODS OF USE FOR CHARGING AN ELECTRIC AIRCRAFT", the entirety of each one of which is incorporated herein by reference.

With continued reference to FIG. 2A, mating component 228 of casing 204 may include a fastener. As used in this disclosure, a "fastener" is a physical component that is designed and/or configured to attach or fasten two or more components together. Connector 200 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferro-magnetic material, and/or an electro-magnet. Fastener may be configured to provide removable attachment between connector 200 and port of electric aircraft. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 2A, connector 200 may include a controller 240. Connector 200 may include one or more charging cables that each include a conductor 208, which has a distal end approximately located within connector 200 and a proximal end approximately located at an energy source of charging unit. As used in this disclosure, a "conductor" is a component that facilitates conduction. As used in this disclosure, "conduction" is a process by which one or more of heat and/or electricity is transmitted through a substance, for example, when there is a difference of effort (i.e., temperature or electrical potential) between adjoining regions. In some cases, conductor 208 may be configured to charge and/or recharge electric aircraft. For instance, conductor 208 may be connected to an energy source of a charging unit and conductor may be designed and/or configured to facilitate a specified amount of electrical power, current, or current type. For example, conductor 208 may include a direct current conductor. As used in this disclosure, a "direct current conductor" is a conductor configured to carry a direct current for recharging an energy source of electric aircraft. As used in this disclosure, "direct current" is one-directional flow of electric charge. In some cases, conductor may include an alternating current conductor. As used in this disclosure, an "alternating current conductor" is a conductor configured to carry an alternating current for recharging an energy source of electric aircraft. As used in this disclosure, an "alternating current" is a flow of electric charge that periodically reverse direction; in some cases, an alternating current may change its magnitude continuously with in time (e.g., sine wave).

In one or more embodiments, and still referring to FIG. 2A, conductor 208 may include a high-voltage conductor 212. In a non-limiting embodiment, high-voltage conductor 212 may be configured for a potential no less than 200 V. In some embodiments, high-voltage conductor may include a direct current (DC) conductor. High-voltage conductor 212 may include a DC conductor pin, which extends from casing 204 and allows for the flow of DC power into and out of the electric aircraft via port. In other embodiments, high-voltage conductor 212 may include an alternating current (AC) conductor. An AC conductor may include any component responsible for the flow of AC power into and out of the electric aircraft. The AC conductor may include a pin that extends from casing 204 that may allow for a transfer of electrical power between connector and power source of electrical aircraft. In some embodiments, a pin of high-voltage conductor 212 may include a live pin, such that the pin is the supply of DC or AC power. In other embodiments, pin of high-voltage conductor 212 may include a neutral pin, such that the pin is the return path for DC or AC power.

With continued reference to FIG. 2A, conductor may include a low-voltage conductor 216. In a non-limiting embodiment, low-voltage conductor 216 may be configured for a potential no greater than 200 V. Low-voltage conductor 216 may be configured for AC or DC current. In one or more embodiments, low-voltage conductor 216 may be used as an auxiliary charging connector to power auxiliary equipment of electric aircraft. In some embodiments, auxiliary equipment may only be powered using low-voltage conductor 216 such that auxiliary equipment is not powered after charging, thus, auxiliary equipment may be off during in-flight activities.

With continued reference to FIG. 2A, high-voltage conductor 212 and low-voltage conductor 216 may receive an electrical charging current from an energy source of charging unit. As used in this disclosure, an "energy source" is a source of electrical power, for example, for charging a battery. In some cases, energy source may include a charging battery (i.e., a battery used for charging other batteries). A charging battery is notably contrasted with an electric aircraft energy source or battery, which is located for example upon electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and still referring to FIG. 2A, charging battery may have a continuous power rating of at least 350 kVA. In other embodiments, charging battery may have a continuous power rating of over 350 kVA. In some embodiments, charging battery may have a battery charge range up to 950 Vdc. In other embodiments, charging battery may have a battery charge range of over 950 Vdc. In some embodiments, charging battery may have a continuous charge current of at least 350 amps. In other embodiments, charging battery may have a continuous charge current of over 350 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric aircraft. In some embodiments, charging battery may include a constant voltage charger, a constant current charger, a taper current charger, a pulsed current charger, a negative pulse charger, an IUI charger, a trickle charger, and a float charger.

In one or more embodiments, and still referring to FIG. 2A, conductor 208 may be an electrical conductor, for example, a wire and/or cable, as previously mentioned above in this disclosure. Exemplary conductor materials may include metals, such as without limitation copper, nickel, steel, and the like. In one or more embodiments, conductor may be disposed within an insulation, such as an insulation sleeve that conductor is at least partially disposed within. For example, and without limitation, conductor 208 may be covered by insulation except for at conductor pin, which may contact a component or interface of port of electric aircraft as part of mating component 228. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

Now referring to FIG. 2B, in some embodiments, a charging unit may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric aircraft and conductors may provide an alternating current to the electric aircraft by way of conductors 208 and connector 200. Alternatively and/or additionally, in some cases, AC-DC converter may be located outside of electric aircraft and an electrical charging current may be provided by way of a direct current to the electric aircraft. In some cases, AC-DC converter may be used to recharge a charging batter. In some cases, AC-DC converter may be used to provide electrical power to one or more of coolant source 236, charging battery, and/or controller 240. In some embodiments, charging battery may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, charging battery may provide power to the grid power component. In this configuration, charging battery may provide power to a surrounding electrical power grid.

With continued reference to FIG. 2B, a conductor 208 may include a control signal conductor configured to conduct a control signal. As used in this disclosure, a "control signal conductor" is a conductor configured to carry a control signal, such as a control signal between an electric aircraft and a charging unit. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric aircraft (e.g., within an electric aircraft battery) and/or located within connector 200. For example, in some cases, control signal may be associated with a battery within an electric aircraft. For example, control signal may include a battery sensor signal. As used in this disclosure, a "battery sensor signal" is a signal representative of a characteristic of a battery. In some cases, battery sensor signal may be representative of a characteristic of an electric aircraft battery, for example as electric aircraft battery is being recharged. In some versions, controller 240 may additionally include a sensor interface configured to receive a battery sensor signal. Sensor interface may include one or more ports, an analog to digital converter, and the like.

Controller 240 may be further configured to control one or more of electrical charging current and coolant flow as a function of sensor signal from a sensor 244 and/or control signal. For example, controller 240 may control a charging battery as a function of a battery sensor signal and/or control signal. In some cases, battery sensor signal may be representative of battery temperature. In some cases, battery sensor signal may represent battery cell swell. In some cases, battery sensor signal may be representative of temperature of electric aircraft battery, for example temperature of one or more battery cells within an electric aircraft battery. In some cases, a sensor, a circuit, and/or a controller 240 may perform one or more signal processing steps on a signal. For instance, sensor, circuit or controller 240 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 2B, a conductor 208 may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration. In some cases, charging battery may include one or electrical components configured to control flow of an electric recharging current or switches, relays, direct current to direct current (DC-DC) converters, and the like. In some case, charging battery may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charging battery or within communication with charging battery are configured to affect electrical recharging current according to control signal from controller 240, such that the controller 240 may control at least a parameter of the electrical charging current. For example, in some cases, controller 240 may control one or more of current (Amps), potential (Volts), and/or power (Watts) of electrical charging current by way of control signal. In some cases, controller 240 may be configured to selectively engage electrical charging current, for example ON or OFF by way of control signal.

With continued reference to FIG. 2B, a conductor 208 may include a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric aircraft port and/or test port. In some cases, a proximity signal may include an analog signal, a digital signal, an electrical signal, an optical signal, a fluidic signal, or the like. In some cases, a proximity signal conductor may be configured to conduct a proximity signal indicative of attachment between connector 200 and a port, for example electric aircraft port.

Still referring to FIG. 2B, in some cases, connector 200 may additionally include a proximity sensor. For example, and without limitation, sensor 244 may include a proximity sensor. Proximity sensor may be electrically communicative with a proximity signal conductor. Proximity sensor may be configured to generate a proximity signal as a function of connection between connector 200 and a port, for example port of electric aircraft. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

Still referring to FIG. 2B, in some embodiments, connector 200 may additionally include an isolation monitor conductor configured to conduct an isolation monitoring signal. In some cases, power systems for example charging battery or electric aircraft batteries must remain electrically isolated from communication, control, and/or sensor signals. As used in this disclosure, "isolation" is a state where substantially no communication of a certain type is possible between to components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric aircraft, are often by virtue of their function placed in close proximity with a battery. A battery sensor that measures battery charge and communicates a signal associated with battery charge back to controller 240 is at risk of becoming unisolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., battery and/or charging battery) may be required for housing of connector 200 and a ground. Isolation monitoring signal may, in some cases, communication information about isolation between an electrical power and ground, for example along a flow path that includes connector 200.

Figure 3:
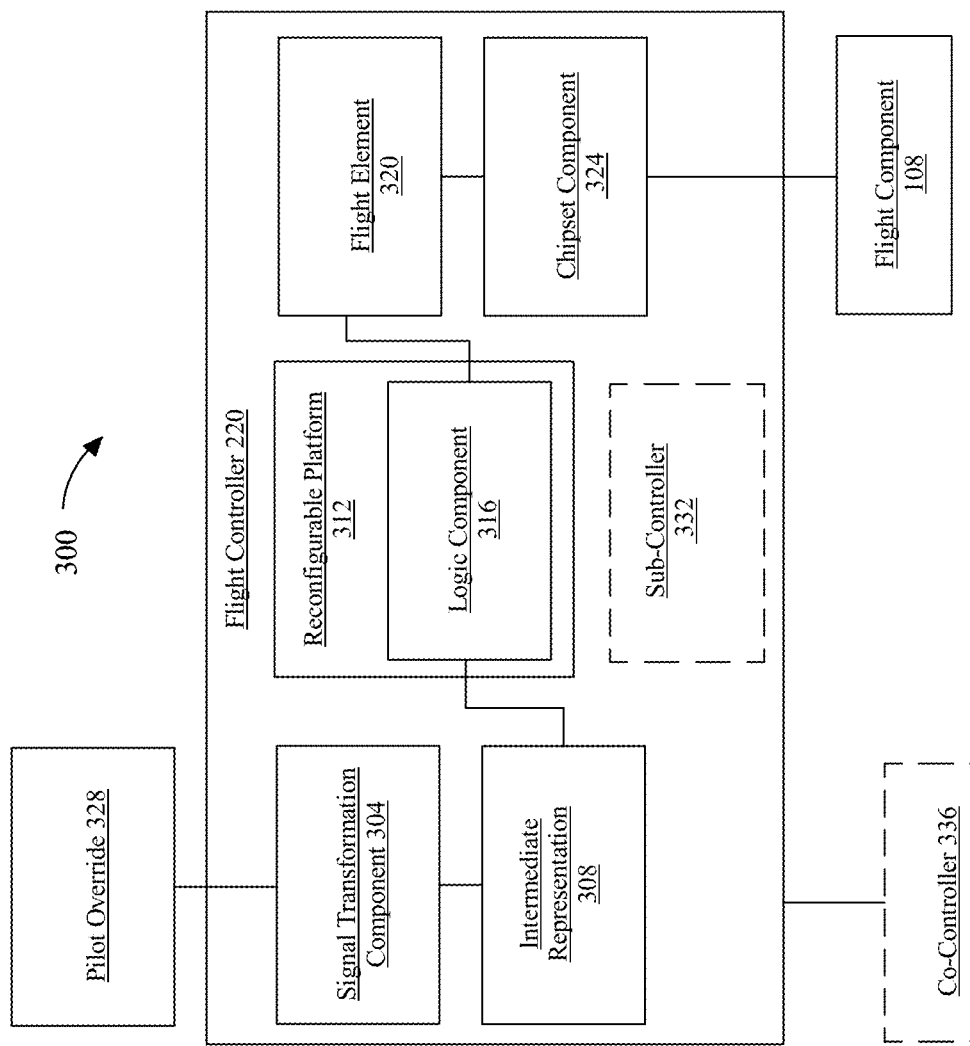
FIG. 3 is a block diagram of a flight controller according to an embodiment in the present disclosure.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

With continued reference to FIG. 3, in an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 108. As used in this disclosure a "flight component" is a portion of an aircraft that can be moved or adjusted to affect one or more flight elements. For example, flight component 108 may include a component used to affect the aircrafts' roll and pitch which may include one or more ailerons. As a further example, flight component 108 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller is configured to produce both autonomous and semi-autonomous flight. As used in this disclosure an "autonomous function" is a mode and/or function of flight controller that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller may generate autonomous function as a function of an autonomous machine-learning model. Training data is used to train autonomous machine-learning model; training data may be stored in a database or based on expert input. Training data may include an input of the charge of the batteries and an output of whether they need to be charged. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller to control and/or maintain a portion of aircraft, a portion of the flight plan, the entire aircraft, and/or the entire flight plan. As a further non-limiting example, pilot signal 336 may include an implicit signal, wherein flight controller detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller and/or a remote device may or may not use in the generation of autonomous function. As used in this disclosure, "remote device" is an external device to flight controller. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller. Remote device and/or FPGA may transmit a signal, bit, datum, or parameter to flight controller that at least relates to autonomous function. Additionally or alternatively, the remote device and/or FPGA may provide an updated machine-learning model. For example, and without limitation, an updated machine-learning model may be included of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller may include, but is not limited to, for example, a cluster of flight controllers in a first location and a second flight controller or cluster of flight controllers in a second location. Flight controller may include one or more flight controllers dedicated to data storage, security, distribution of traffic for load balancing, and the like. Flight controller may be configured to distribute one or more computing tasks as described below across a plurality of flight controllers, which may operate in parallel, in series, redundantly, or in any other manner used for distribution of tasks or memory between computing devices. For example, and without limitation, flight controller may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller may also be implemented using a "shared nothing" architecture in which data is cached at the worker, in an embodiment, this may enable scalability of aircraft and/or computing device. Flight controller may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller as components and/or nodes of a distributer flight controller as described above. For example, and without limitation, co-controller 344 may include one or more controllers and/or components that are similar to flight controller. As a further non-limiting example, co-controller 344 may include any controller and/or component that joins flight controller to distributer flight controller. As a further non-limiting example, co-controller 344 may include one or more processors, logic components and/or computing devices capable of receiving, processing, and/or transmitting data to and/or from flight controller to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
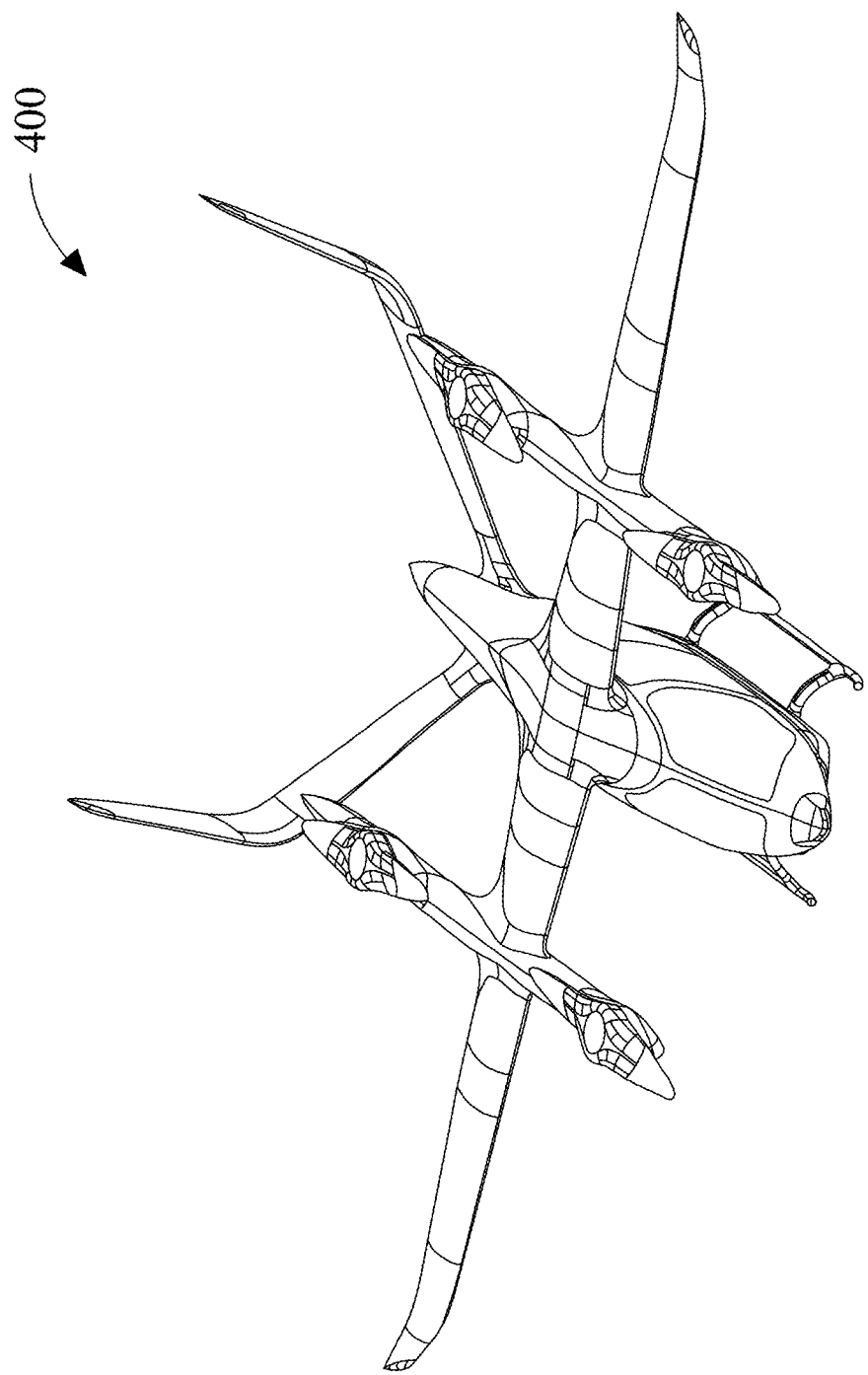
FIG. 4 is an illustration of an embodiment of an electric aircraft in one or more aspect of the present disclosure.

Referring now to FIG. 4, an embodiment of an electric aircraft 400 is presented in accordance with one or more embodiments of the present disclosure. Electric aircraft 108 may be electric aircraft 400. Electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
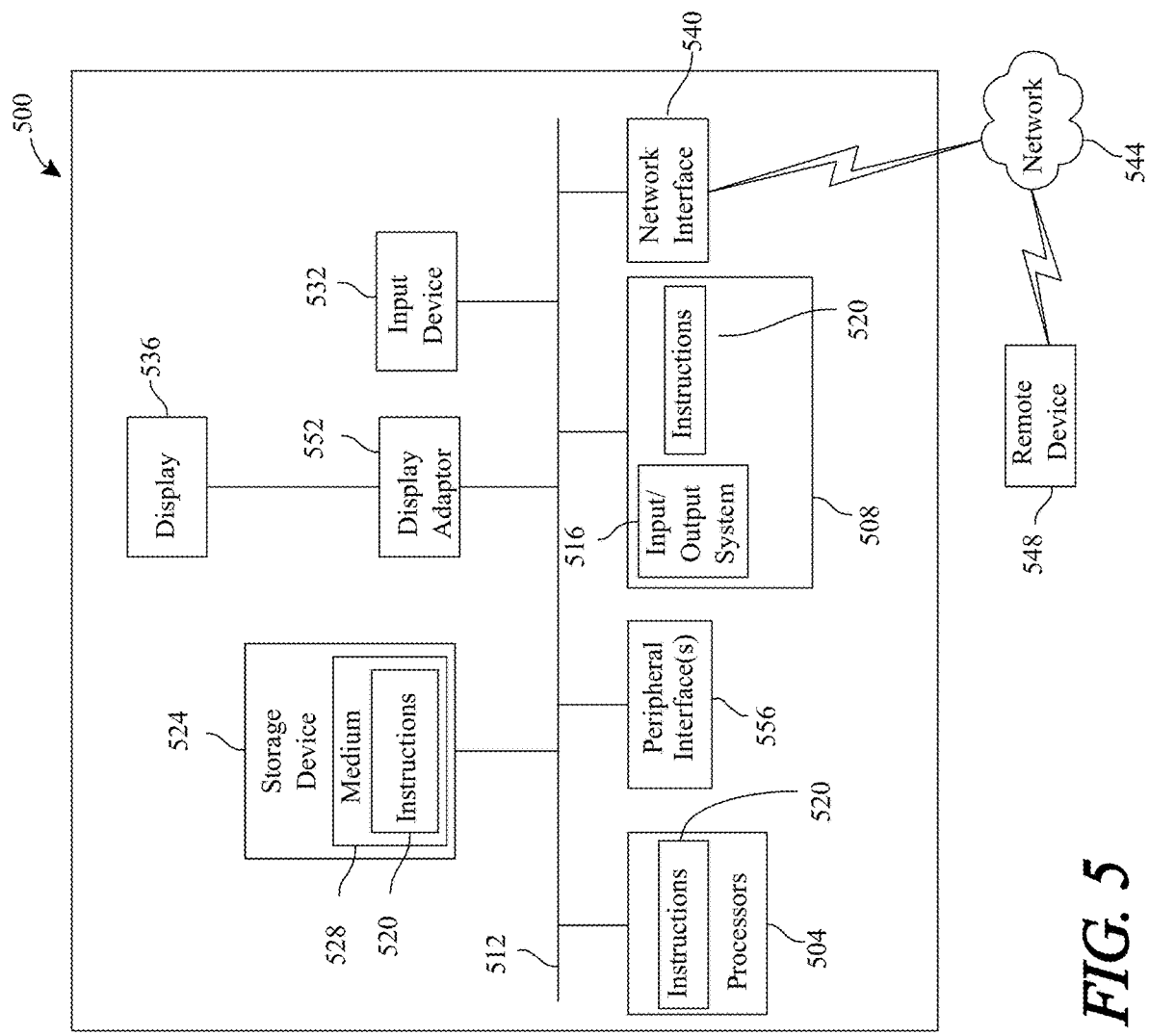
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A ground service system for an electric aircraft, the system comprising:
   a charging module including a charging cable electrically connected to an energy source and configured to charge a battery of the electric aircraft;

a cooling module including a cooling channel configured to fluidly couple the electric aircraft to a first coolant source,
wherein the cooling module is configured to transmit a first coolant from the first coolant source and through the cooling channel to the electric aircraft to regulate a temperature of the battery;
a cabin soak module including a cabin soak channel configured to fluidly couple the electric aircraft and a second coolant source,
wherein the cabin soak module is configured to transmit a second coolant from the second coolant source through the cabin soak channel and into a cabin of the electric aircraft.

2. The system of claim 1, wherein the charging module further includes a charging sensor configured to detect a condition parameter of the battery of the electric aircraft.

3. The system of claim 1, wherein the charging module further includes a charging connector electrically connected to the charging cable opposite the energy source and configured for coupling to a charging port of the electric aircraft.

4. The system of claim 3, wherein the charging connector further includes a communication pin communicatively coupled to a flight controller of the electric aircraft and exchange data therebetween.

5. The system of claim 3, wherein the charging connector further includes a proximity pin configured to transmit a proximity signal when coupled to the charging port of the electric aircraft, the proximity signal indicating electrical communication between the charging connector and the charging port.

6. The system of claim 3, wherein the charging module further includes a charge control panel configured to display a condition parameter of the battery of the electric aircraft.

7. The system of claim 6, wherein the condition parameter includes a state of charge of the battery of the electric aircraft.

8. The system of claim 1, wherein the cooling module further includes a cooling control panel configured to control flow of the first coolant through the cooling channel and the electric aircraft.

9. The system of claim 1, wherein the cooling module further includes:
a cable storage device configured to house the cooling channel therein; and
a reel disposed in the cable storage device and configured to hold the cooling channel thereon.

10. The system of claim 9, wherein the cooling module further includes:
a rotation mechanism configured to selectively rotate the reel; and
a reel control operatively coupled to the rotation mechanism, wherein the reel control is configured to:
actuate the rotation mechanism in a first direction, which causes the reel to rotate in the first direction, and in turn cause the cooling channel to wind around the reel; and
actuate the rotation mechanism in a second direction opposite the first direction, which causes the reel to rotate in the second direction, and in turn cause the cooling channel to unwind from around the reel.

11. The system of claim 1, wherein the cooling module is communicatively connected to the charging module.

12. The system of claim 11, wherein the cooling module exchanges at least one of operational data, settings data, and sensor measurement data with the charging module.

13. The system of claim 12, wherein the cooling module further includes a cooling sensor configured to measure a temperature parameter of the first coolant.

14. The system of claim 1, wherein the cooling module includes a cooling cable within the cooling channel and fluidly coupled to the battery of the electric aircraft through a cooling connector.

15. The system of claim 1, wherein the cabin soak module is communicatively connected to the charging module.

16. The system of claim 15, wherein the cabin soak module exchanges at least one of operational data, settings data, and sensor measurement data with the charging module.

17. The system of claim 15, wherein the cabin soak module further includes a cabin soak sensor configured to measure a temperature parameter of the cabin of the aircraft.

18. The system of claim 1, wherein the cabin soak module comprises a cabin soak control panel configured to control flow of the second coolant through the cabin soak channel and to the cabin of the electric aircraft.

19. The system of claim 1, wherein the charging module, the cooling module, and the cabin soak module are each removably coupled to a ground service system housing.

20. The system of claim 1, further comprising a charging controller in communication with the charging module.

* * * * *